United States Patent
Tiwari et al.

(10) Patent No.: US 9,582,068 B2
(45) Date of Patent: Feb. 28, 2017

(54) CIRCUITS AND METHODS PROVIDING STATE INFORMATION PRESERVATION DURING POWER SAVING OPERATIONS

(71) Applicant: QUALCOMM Incorporated, San Diego, CA (US)

(72) Inventors: Harshit Tiwari, Telangana (IN); Maheshwar Thakur Singh, Telangana (IN); Ashish Bajaj, Telangana (IN); Nikesh Gupta, Telangana (IN)

(73) Assignee: QUALCOMM INCORPORATED, San Diego, CA (US)

( * ) Notice: Subject to any disclaimer, the term of this patent is extended or adjusted under 35 U.S.C. 154(b) by 138 days.

(21) Appl. No.: 14/630,392

(22) Filed: Feb. 24, 2015

(65) Prior Publication Data
US 2016/0246356 A1    Aug. 25, 2016

(51) Int. Cl.
*G06F 1/32*    (2006.01)

(52) U.S. Cl.
CPC .......... *G06F 1/3287* (2013.01); *G06F 1/3243* (2013.01); *G06F 1/3265* (2013.01); *G06F 1/3293* (2013.01); *G06F 1/3296* (2013.01); *Y02B 60/1239* (2013.01); *Y02B 60/1282* (2013.01)

(58) Field of Classification Search
CPC .... G06F 1/3287; G06F 1/3265; G06F 1/3293; G06F 1/329
See application file for complete search history.

(56) References Cited

U.S. PATENT DOCUMENTS

| 8,028,185 | B2 | 9/2011 | Branover et al. | |
|---|---|---|---|---|
| 8,261,101 | B1 | 9/2012 | Wijaya et al. | |
| 8,416,013 | B1 | 4/2013 | Sonkar et al. | |
| 2003/0009702 | A1* | 1/2003 | Park ...................... | G06F 1/3203 713/300 |
| 2005/0276132 | A1 | 12/2005 | Severson et al. | |
| 2007/0005995 | A1* | 1/2007 | Kardach ............... | G06F 1/3203 713/300 |
| 2009/0204837 | A1* | 8/2009 | Raval ..................... | G06F 1/3203 713/330 |

(Continued)

OTHER PUBLICATIONS

ARM: "ARM Cortex-A53 MPCore Processor: Technical Reference Manual", Feb. 14, 2014 (Feb. 14, 2014), XP055269442, pp. 635, Retrieved from the Internet: URL:http://infocenter.arm.com/help/topic/com.arm.doc.ddi0500d/DDI0500D_cortex_a53_r0p2_trm.pdf [retrieved on Apr. 28, 2016] the whole document.

(Continued)

*Primary Examiner* — Vincent Tran
(74) *Attorney, Agent, or Firm* — Haynes and Boone, LLP

(57) ABSTRACT

Methods, systems, and circuits for preserving state information during power saving operations are disclosed. One example embodiment includes a circuit having a processing core, where the processing core includes logic processing circuits as well as circuits (e.g., flip-flops registers) that are used to store state information in the processing core. The logic processing circuits have power connections to a power rail that are subject to a switch, which can disconnect the power connections from the power rail. The circuits that are used to store state information have different power connections that are subject to a different switch. Therefore, the logic processing circuits and the state information circuits can be separately power-collapsed.

27 Claims, 8 Drawing Sheets

(56) References Cited

U.S. PATENT DOCUMENTS

| | | | | |
|---|---|---|---|---|
| 2011/0296211 | A1* | 12/2011 | Ramaraju | G06F 1/3203 |
| | | | | 713/320 |
| 2012/0166852 | A1* | 6/2012 | Sodhi | G06F 1/3287 |
| | | | | 713/324 |
| 2013/0013945 | A1* | 1/2013 | Jahagirdar | G06F 1/3203 |
| | | | | 713/320 |
| 2013/0027413 | A1* | 1/2013 | Jayavant | G06F 1/325 |
| | | | | 345/520 |
| 2013/0173902 | A1* | 7/2013 | Sodhi | G06F 1/3243 |
| | | | | 713/100 |
| 2014/0189225 | A1 | 7/2014 | Conrad et al. | |
| 2014/0361823 | A1 | 12/2014 | Lundberg | |
| 2015/0178091 | A1* | 6/2015 | Offen | G06F 9/3861 |
| | | | | 712/228 |
| 2015/0277532 | A1* | 10/2015 | Mishaeli | G06F 1/3206 |
| | | | | 713/324 |

OTHER PUBLICATIONS

International Search Report and Written Opinion—PCT/US2016/016392—ISA/EPO—May 30, 2016.
Iyer L: "Qualcomm Snapdragon(TM) Processor Power Management—Unique Challenges for Power Frameworks", Sep. 15, 2014 (Sep. 15, 2014), XP055269464, Retrieved from the Internet: URL:http://www.slideshare.net/linaroorg/lcu14-210-qualcomm-snapdragon-power-management-unique-challenges-for-power-frameworks [retrieved on Apr. 28, 2016] p. 5-p. 6.
Van Der Meer P.R., et al., "New Standby-Current Reduction Technique for Deep Sub-Micron VLSI CMOS Circuits: Smart Series Switch," European Solid-State Circuits Conference (ESSCIRC), 2002, pp. 663-666.

* cited by examiner

CIRCUITS AND METHODS PROVIDING STATE INFORMATION PRESERVATION DURING POWER SAVING OPERATIONS

TECHNICAL FIELD

This application relates to power savings in processor devices, and more particularly, to power saving circuits and methods that preserve state information.

BACKGROUND

Various conventional techniques exist for saving power in processing cores. One such example is clock gating, which may include turning a clock signal on and off to specific circuitry. When that circuitry is no longer receiving a clock signal, it stops processing and transferring information, thereby reducing its dynamic power consumption to zero or very near zero. However, the various transistors of the circuitry may leak current even while the clock signal is gated. In some conventional circuits, leakage current may be responsible for a significant percentage of overall power consumed. In fact, as transistors continue to get smaller, leakage power may become more significant in some systems.

Another conventional technique for saving power in processing cores includes power collapsing. Power collapsing may include reducing an operating voltage of a circuit to zero, for example, by use of a switch that disconnects the circuit from power when the circuit is not needed. Later on, when the system expects to use the circuit, the system can restore power by closing a switch to connect the circuit to power. Such conventional techniques may provide acceptable reductions in leakage power, but either erase state information or employ complicated systems to preserve the state information during power down. Erasing state information may cause unacceptable latency, and complicated systems to preserve state information may actually consume more power than can be saved through power collapsing. There is therefore a need for improved clocking and gating techniques.

Other techniques include powering different portions of a system separately. In one example, Static Random Access Memory (SRAM) is powered separately from processing logic circuits. In such systems, the SRAM includes megabytes or gigabytes of storage capacity, and also is optimized to be efficient by utilizing specific voltage ranges for storing data. Such conventional techniques arise because large blocks of SRAM have different operational requirements than their corresponding processing logic circuits and, thus, can be treated differently. While it is possible to use power gating separately on processing logic circuits and on large blocks of SRAM, there is currently no technique that treats circuits within the processing logic separately from other circuits within the processing logic.

SUMMARY

Methods, systems, and circuits for preserving state information during power saving operations are disclosed herein. One example embodiment includes a circuit having a processing core, where the processing core includes logic processing circuits as well as circuits (e.g., flip-flops and registers) that are used to store state information in the processing core. The logic processing circuits have power connections to a power rail that are subject to a switch, which can disconnect the power connections from the power rail. The circuits that are used to store state information have different power connections that are subject to a different switch. Therefore, the logic processing circuits and the state information circuits can be separately power-collapsed.

The example circuit may further include an applications processor, which operates the switches. For instance, during an active processing operation, the applications processor determines that processing is ongoing and accordingly keeps both switches on. During an idle state, where the processing operation is still ongoing but the processing logic circuits pause before another burst of active processing, the applications processor turns off one of the switches to power-collapse the processing logic circuits while keeping the other switch on so that the state information circuits continue to receive power.

Another example embodiment includes a method for separately power-collapsing processing logic circuits and state information circuits. The example method may be employed in a system having an architecture similar to that described above, wherein power connections for the processing logic circuits and power connections for the state information circuits are subject to separate and different switches.

During an active processing operation, both switches are on so that both the processing logic circuits and the state information circuits are powered. During an idle state, where the processing operation is still ongoing but the processing logic circuits are between active bursts, the processing logic circuits may be power-collapsed while the state information circuits continue to receive power. In such an instance, the switch providing power to the processing logic circuits is off, and the switch providing power to the state information circuits is on. In this way, the state information may be preserved while leakage current is minimized. In one example embodiment, during the idle state, an applications processor or other component reduces the voltage on the power rail to a retention voltage that is lower than the operating voltage but high enough so that the state information remains stored. Once the processing operation is over, both the state information circuits and the processing logic circuits may be power-collapsed if desired.

In another embodiment, a system on a chip (SoC) is disclosed. The SoC includes a variety of processing units, such as separate processing cores. Each of the processing cores includes both state information circuitry and processing logic circuitry. Focusing on one of the processing cores, the state information circuitry includes power connections that are fed by a first switch, and the processing logic circuitry includes power connections that are fed by a second switch that is different from the first switch. Each of the processing cores may have a similar architecture. An applications processor or other circuit may determine whether a given processing core is an active processing state, and idle state, or not in a processing state and control its respective switches accordingly.

DETAILED DESCRIPTION

Figure 1:
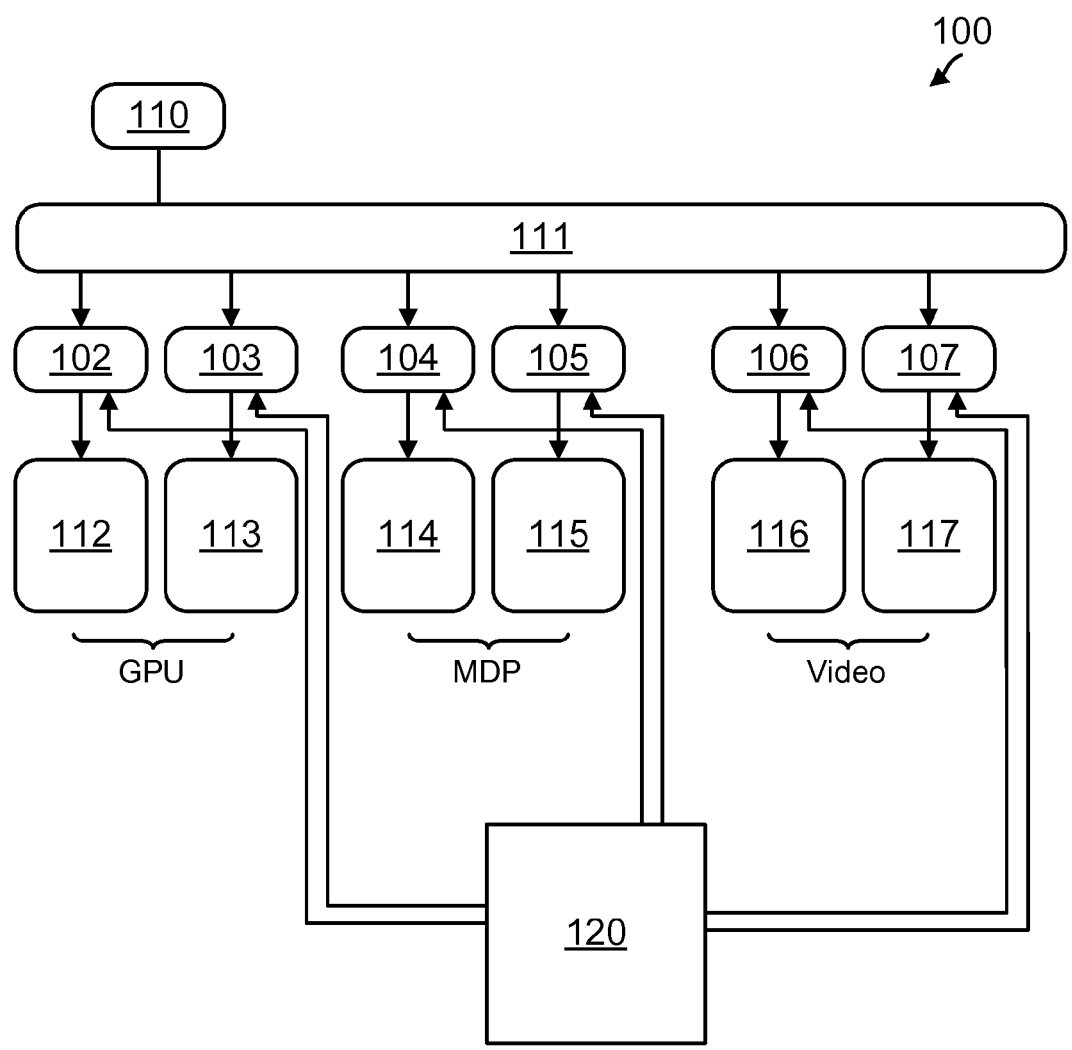
FIG. 1 is an illustration of an example architecture including an applications processor and multiple processing cores, according to one embodiment.

FIG. 1 is an illustration of an example power architecture 100, according to one embodiment. The example embodiment includes power supply 110, which may include a Switched Mode Power Supply (SPMS) that steps down a supply voltage to a voltage that is usable by processing cores and other components. A SPMS is one example of an appropriate power supply, although the scope of embodiments is not limited to any particular type of power supply. Power supply 110 is in communication with power rail 111, which distributes power to the various components, as described further below.

The illustrated embodiment includes a plurality of processing cores, each of them divided into a portion referred to as "state" and a portion referred to as "logic." For instance, a Graphic Processor Unit (GPU) includes a portion 112 that stores and transfers state information and a logic portion 113 that processes data. Similarly, a Mobile Display Processor (MDP) includes state portion 114 and logic portion 115, and a video core includes a state portion 116 and a logic portion 117. Power supply 110 provides power to the cores via power rail 111 and switches 102-107.

Power supply 110 provides power to the processing cores via closed switches 102-107. In order to save power, any of state or logic portions 112-117 may be disconnected from power rail 111 by operating the corresponding switch 102-107. For example, in an embodiment, a smartphone includes digital circuitry implementing the architecture 100, and the processing cores having portions 112-117 are cores in a multi-core processor.

Power architecture 100 also includes applications processor 120, which is in communication with each of the switches 102-103. The applications processor 120 may be embodied as a separate processing core, and it implements the power saving process described in this example. The applications processor 120 assigns processing jobs to the various cores in architecture 100, and thus determines whether a given core is in an active processing state, is in an idle state, or is not in a processing state. As explained further below, applications processor 120 determines the states of the various cores and controls power distribution in response to determining the states.

Digital circuits are usually integrated on semiconductor dies, and the processing cores and applications processor 120 of FIG. 1 may be present on a single semiconductor die in a mobile device. A system on chip (SoC) refers to multiple processing cores embedded on a single die. A processing core is a functional block on the SoC. Power architecture 100 may be embodied as part of a SoC, where each of the processing cores represent physical cores that are implemented using a semiconductor technology in a multi-core processor. Also, while power architecture 100 shows three different processing cores, it is understood that the principles herein may be scaled to any appropriate number of processing cores. Also, various embodiments may include multiple power rails and or multiple power supplies to supply power to a variety of different cores.

For the purposes of this example, the aspects of the GPU will be described, but it is understood that the other processing cores and their respective power switches operate in a similar manner. In the illustrated example, the GPU is conceptually divided into a state portion 112, which includes a plurality of transistors that form flip-flops, registers, and other components that store state information as the GPU operates. The GPU is also conceptually divided into a logic portion 113, which has logic to process data according to the state information. In one example, the data itself is graphics data that is colored or texturized by processes performed by the GPU, and the state information provides an indication to the GPU about the current state of the operation or of the data itself (such as information allowing the processed data to be reassembled after processing).

Figure 2:
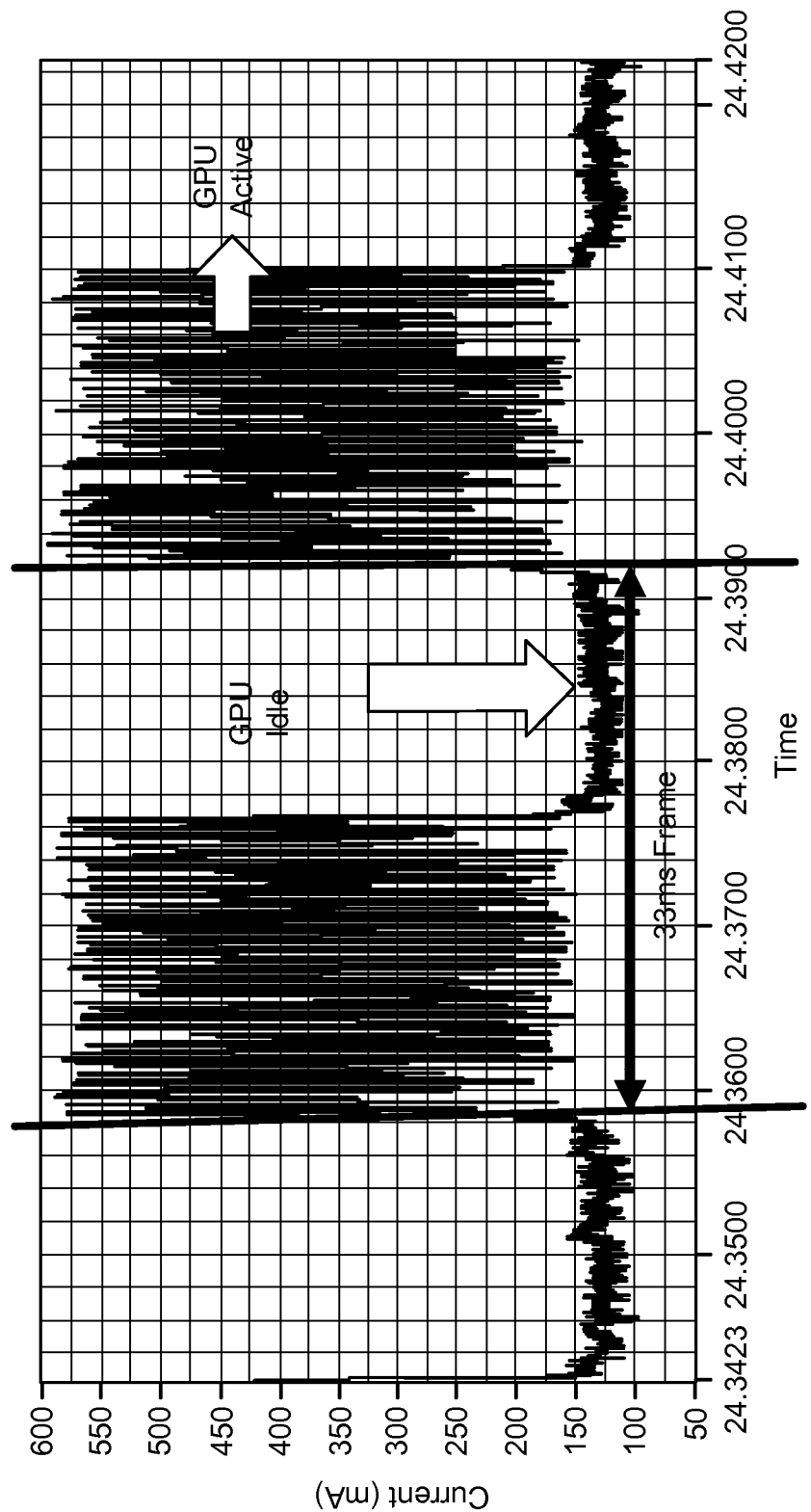
FIG. 2 is an illustration of an example frame processing operation by a processing core of the FIG. 1 architecture, according to one embodiment.

The GPU of this example includes a particular cadence in its processing that lends itself to the power-savings technique described below. In one example, the GPU performs a fixed frame-rate operation using, for instance, a 30 frame per-second rate. Each frame is 33 ms, and part of the 33 ms for each frame includes the GPU actively processing data during the operation, and another part of the 33 ms for each frame includes an idle state during the data processing operation where the GPU has finished processing the data for that particular frame and is waiting to process data for the next frame. A conventional GPU operation with a 33 ms frame is illustrated in FIG. 2 in terms of current consumed by the GPU, which correlates to processing activity by the GPU. Times of high current consumption correspond to active processing, and times of lower current consumption correspond to idle portions of the processing operation. However, the scope of embodiments is not limited to any particular frame rate or operating cadence, and in fact, the techniques described herein for saving power may be applied to cores other than GPUs.

Switch 102 couples state portion 112 of the GPU to the power rail 111, and switch 103 couples the logic portion 113 of the GPU to the power rail 111. Similarly, switches 104-107 couple their respective state portions 114, 116 and logic portions 115, 117 to power rail 111 as well. In one embodiment, the switches 102-107 are each embodied as a Globally Distributed Head Switch (GDHS), where head switches couple a component to power, as opposed to ground. Although not shown in this example, some embodiments may use foot switches, which couple components to ground rather than to power. Applications processor 120 is in communication with each switch 102-1072 individually and selectively turn the switches 102-107 on and off, as explained below.

Applications processor 120 has switching logic to control the different switches 102-107. The applications processor 120 determines the operational state of the GPU. When the switching logic determines that the GPU is actively processing data in the processing operation, then it causes both switches 102 and 103 to be on (e.g., by applying an appropriate voltage to a gate of a transistor). When applications processor 120 determines that the GPU is in a processing operation but is currently idle, then the switching logic causes switch 103 to be off while maintaining switch 102 in an on state, thereby preventing leakage at the GPU logic but at the same time preserving the state information. If applications processor 120 determines that there is no processing operation ongoing, then the switching logic may cause both switches 102 and 103 to be off, thereby preventing leakage but also losing the state information. This example refers to the GPU, though the applications processor 120 controls switches 104-107 in a similar manner for the MDP core and the video core to independently turn off logic portions 115 and 117 while preserving state information at state portions 114 and 116.

Figure 3:
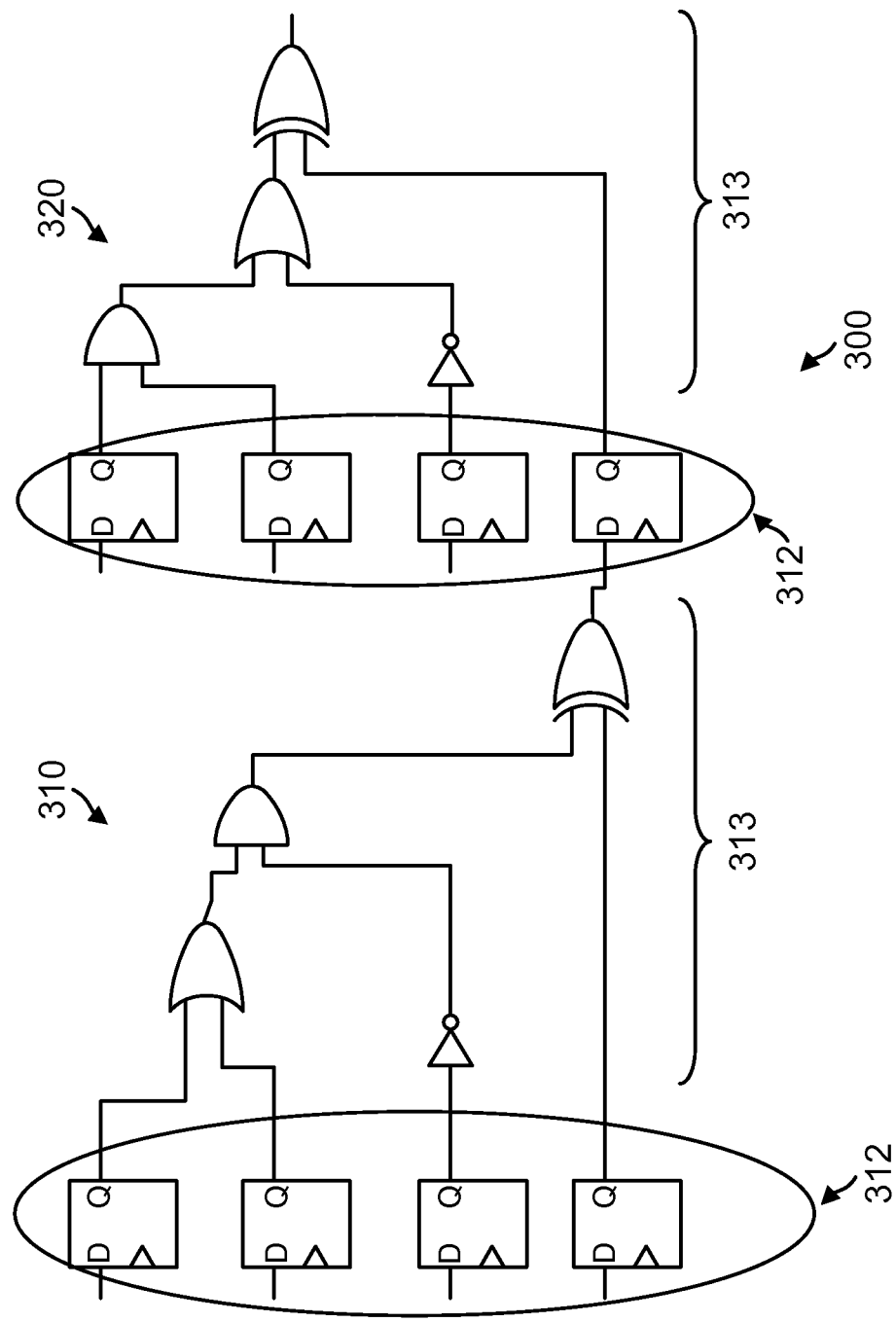
FIG. 3 is a gate-level illustration of an example division of state circuitry and logic circuitry of a processing core, according to one embodiment.

FIG. 3 is an illustration of a portion of an example processing core 300, according to one embodiment. FIG. 3 is provided to illustrate the difference between a state portion (such as state portion 112 of FIG. 1) and a logic portion (such as logic portion 113 of FIG. 1) in a processing core. FIG. 3 is an illustration at a logic gate level, where flip-flops 312 are circuits that store state information, and combinational logic 313 are circuits it provide logic processing. Flip-flops 312, registers (not shown), and latches (not shown) are examples of a state portion of a core. Combinational logic 313 is made of a variety of logic gates, and it is an example of a logic portion of the core. FIG. 3 is for example only, and it is understood that state portions and logic portions of cores may be arranged in various architectures not limited to the specific gates shown in FIG. 3.

The embodiment of FIG. 3 is different from a conventional system that powers processing circuits and SRAM separately at least because the flip-flops of FIG. 3 are small and discrete portions of memory, as opposed to a large block. Also, the flip-flops of FIG. 3 are not physically segregated from the processing circuits.

Figure 4:
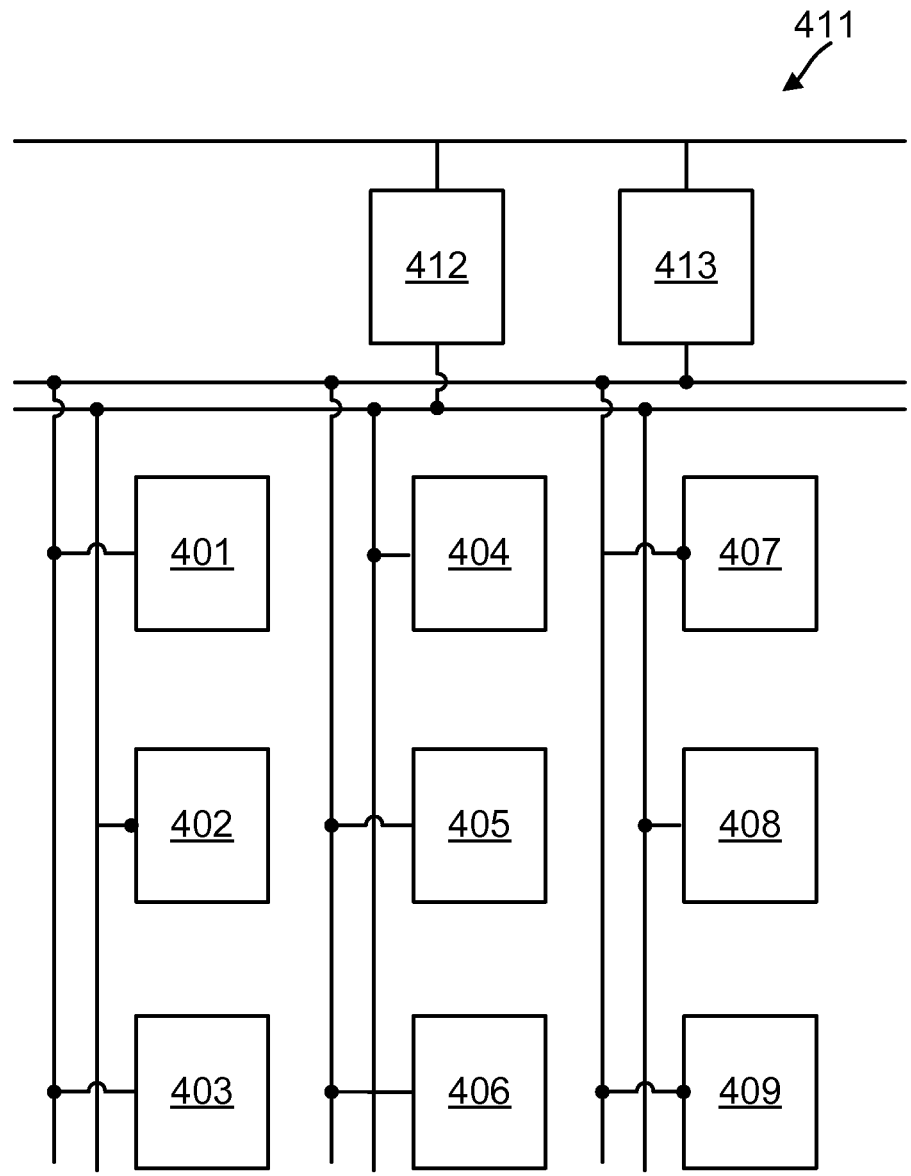
FIG. 4 is an illustration of an example arrangement of transistors within a processing core, where some transistors corresponds to a state portion and other transistors correspond to a logic portion, according to one embodiment.

The illustrations above are conceptual, and it is understood that the actual physical implementation would be slightly different. For instance, in a real-world processing core (e.g., a GPU, MDP core, a video core, modem or the like), the transistors making up the state portion may not be physically segregated from the transistors making up the logic portion. Rather, those subsets of transistors may be interspersed within the processing core. FIG. 4 shows a plurality of transistors 401-409, switches 412 and 413, and power rail 411, adapted according to one embodiment.

Switch 412 powers of a subset of the transistors, and switch 413 powers another subset of the transistors, via power rail 411. Specifically, transistors 402, 404, 406, and 408 have power connections that terminate at switch 412. When switch 412 is on, those transistors receive power, and when switch 412 is off, those transistors do not receive power. Transistors 401, 403, 405, 407, and 409 have power connections that terminate at switch 413. Thus, when switch 413 is on, those transistors receive power, and with switch 413 is off, those transistors do not receive power. The power connections shown in FIG. 4 are illustrative of conductive lines, such as metal lines or metal layers that may be formed during semiconductor manufacturing processes or other appropriate processes.

In FIG. 4, the subset of transistors powered via switch 412 may represent the state portion, and the subset of transistors powered via switch 413 may represent a logic portion. The first subset of transistors (402, 404, 406, and 408) are not segregated or contiguous, but rather are interspersed with the second subset of transistors (401, 403, 405, 407, and 409). Nevertheless, this embodiment includes a power scheme where switch 412 provides power to the transistors of the state portion, and switch 413 provides power to the transistors of the logic portion, and the non-contiguous arrangement of the subsets of transistors 401-409 results in an invasive wiring design within the example processing core.

Of course, the arrangement of transistors 401-409 is illustrative, and it is understood that real-world embodiments may include millions or billions of transistors, and the transistors that form a state portion and a logic portion may be more or less interspersed, depending on the design of the particular processing core. FIG. 4 is intended to provide an example at a transistor-level of a circuit, which complements the gate-level illustration of FIG. 3. It is also understood that the principles illustrated with respect to FIGS. 3 and 4 apply to the separation of state portions and logic portions in the embodiment of FIG. 1.

Figure 5:
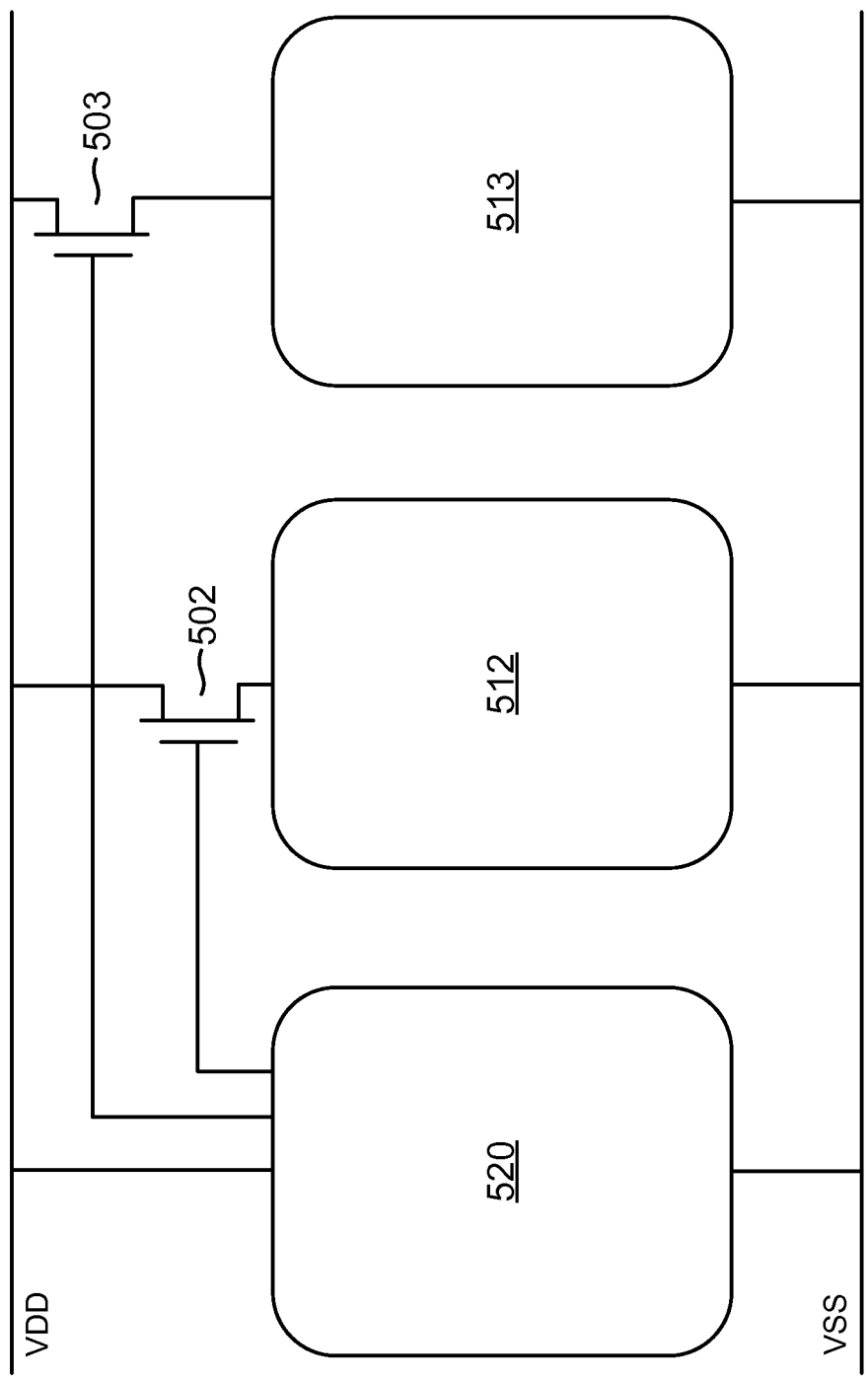
FIG. 5 is an illustration of an example applications processor and processing core, according to one embodiment.

FIG. 5 is an illustration of the power saving architecture discussed above and applied to an example core, according to one embodiment. A core is divided into two domains; domain 512 includes circuitry that stores state information, whereas domain 513 is combinational logic that processes data according to the state information. Domain 512 is coupled to power rail VDD by switch 502, which in this illustration is a transistor head switch. Domain 512 is also coupled to ground VSS. Domain 513 is coupled to VDD by transistor head switch 503 and is also coupled to ground VSS. Similarly, applications processor 520 is disposed between VDD and VSS, thereby receiving power to operate.

Applications processor 520 is in communication with switches 502 and 503 so that it can individually and selectively cause either of switches 502 and 503 to be on or off. For example, if switches 502 and 503 are embodied as PMOS transistors, then applications processor 520 may turn a given PMOS transistor off by applying a high-voltage and turn the transistor on by applying a low-voltage. Applications processor 520 may turn a NMOS transistor on by applying a high-voltage and turn it off with a low-voltage.

Applications processor 520 operates similarly to applications processor 120 of FIG. 1. For instance, when applications processor 520 determines that the processing core is actively processing information (e.g., is in the active processing portion of 33 ms frame) it causes switches 502 and 503 to be on. When applications processor 520 determines that the processing core has then progressed to the idle portion of a processing state (e.g., is in the idle portion of a 33 ms frame) it causes switch 503 to be off and causes switch 502 to be on, thereby reducing or eliminating leakage current in the domain 513 while preserving state information in the domain 512.

When applications processor 520 determines that the processing core is not in a processing state (e.g., does not have a frame to process) it causes switches 502 and 503 to be off, thereby preventing leakage current in both domains 512 and 513, although state information is lost. However, since the processing core does not currently have a processing job, the loss of state information may not be significant.

Applications processor 520 in this example determines that the processing core is in an active processing state or is in an idle state because applications processor 520 assigns processing jobs to the core. In another embodiment, the logic responsible for turning switches 502 and 503 may be in another circuit and may determine a processing state of a given core by detecting increased current usage (such as typified by the active processing in a 33 ms frame in FIG. 2), by examining state information to know whether a processing job is currently being processed, or by using any other appropriate technique.

Figure 6:
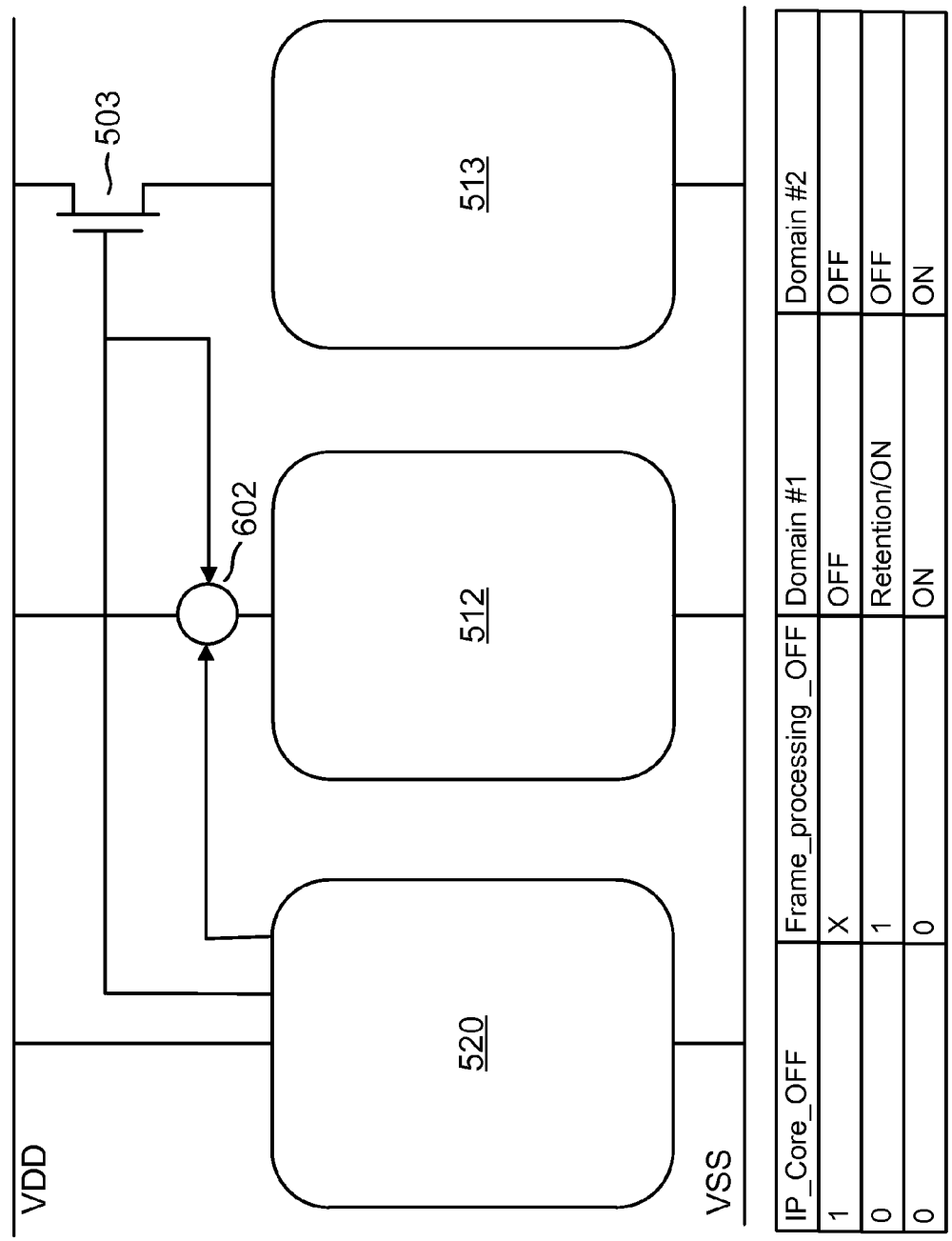
FIG. 6 is an illustration of an example applications processor and processing core, according to one embodiment.

FIG. 6 is an illustration of the power saving architecture discussed above and applied to an example core, according to one embodiment. The embodiment of FIG. 6 differs from the embodiment of FIG. 5 in that the embodiment of FIG. 6 uses a voltage regulator 602, for example a Low Drop Out (LDO) voltage regulator, to supply voltage to domain 512.

The embodiment of FIG. 5 operates similarly to the embodiment of FIG. 6 in that domain 513 may be power-collapsed during an idle portion of a processing operation. Similarly, domain 512 may also be power collapsed when there is no ongoing processing operation. The presence of voltage regulator 602 allows for additional functionality beyond that offered by the embodiment of FIG. 5. Specifically, applications processor 520 may supply power to domain 512 or turn power off to domain 512, and applications processor 520 may lower the voltage it supplies to domain 512 to another appropriate voltage. In this example, voltage regulator 602 may act as a switch, supplying power to domain 512 or power-collapsing domain 512 is appropriate, or may provide a voltage different from either VDD or VSS.

In one example, applications processor 520 may lower the voltage supplied to domain 512 to a value between VDD and VSS that is high enough to preserve the data stored by the transistors in the state circuitry. Applications processor 520 may lower the voltage supplied to domain 512 by controlling voltage regulator 602 to achieve an appropriate intermediate value between VDD and VSS. An example of truth table is shown in FIG. 6, showing that domain 512 may be supplied with a retention voltage during an idle portion of a processing operation.

The operation of a conventional GPU is shown in FIG. 2, which shows that a conventional GPU may generally be expected to have a bursty but predictable processing cycle. Specifically, processing operations are performed frame-by-frame, where each frame includes an active processing part and an idle part, which are periodic.

The scope of embodiments is not limited to performing power saving operations on GPUs. Rather, other types of processing cores may be expected to have bursty but predictable processing cycles that may benefit from the power-savings techniques described herein. For instance, an MDP, such as shown in FIG. 1, may also include bursty but predictable operations at a frame rate corresponding to a screen refresh rate of a device. Therefore, same or similar architectures and techniques as described with respect to FIGS. 5 and 6 may be applied to an MDP as well.

Similarly, a video core, such as illustrated in FIG. 1, decodes video data at a frame rate such as 30 frames per second or other appropriate video frame rate. A video core may include active processing and idle portions of a processing operation. A video front end core for a camera also operates at a video frame rate and has predictable active processing portions and idle processing portions. LTE modems and Wi-Fi modems may be embodied in processing cores, and they also are expected to operate at a particular frame rate having active processing portions and idle processing portions. The same is true for an audio core that decodes audio data. These are all examples of processing cores that may be divided into a state information domain and a logic domain, where the logic domain may be separately power-collapsed during an idle portion of a processing operation, according to the various techniques disclosed herein.

Various embodiments may include one or more advantages over conventional solutions. For instance, some of the embodiments described herein allow for powering down even a state portion of a processing core, thereby further reducing leakage current, but doing so at times that the state information can be lost with little to no impact on device performance.

Figure 7:
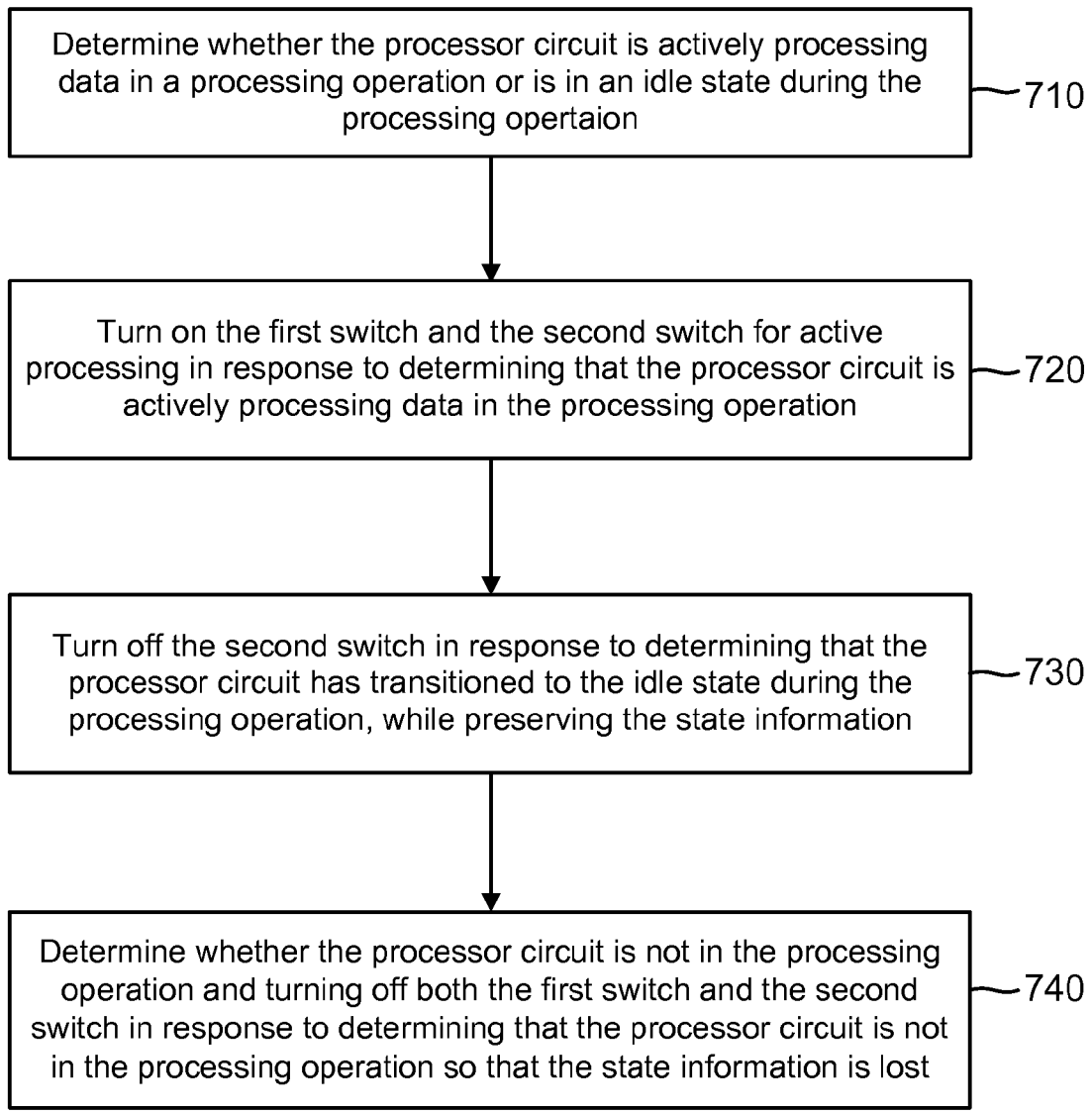
FIG. 7 is an illustration of an example method that may be performed by the circuits of FIGS. 1, 5, and 6, according to one embodiment.

FIG. 7 is an illustration of an example method 700, according to one embodiment. Method 700 may be performed by circuits, such as those shown in FIGS. 1, 5, and 6. Specifically, an applications processor or other appropriate processing circuit may include hardware logic and/or may read instructions coding that logic from a computer-readable medium, where that logic allows the processor or other appropriate processing hardware to perform the actions of method 700. For instance, in one embodiment an applications processor, such as processors 120 or 520 of FIG. 1, 5, or 6, includes the logic to perform the actions of method 700.

Figure 8:
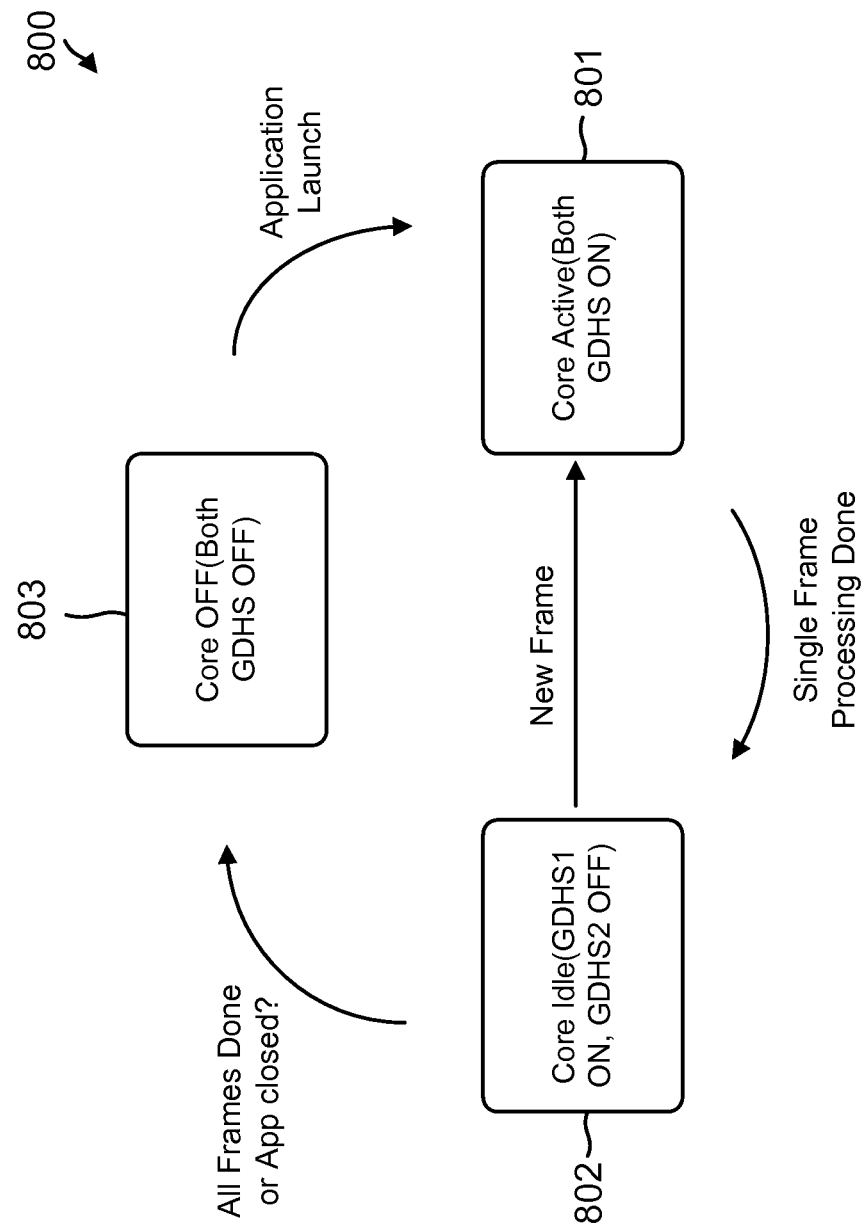
FIG. 8 is an illustration of an example state diagram associated with the method of FIG. 7.

FIG. 8 is a state diagram 800 illustrating multiple power states of a device, such as the devices of FIGS. 1, 5, and 6. The state diagram 800 provides a framework for further explaining the method 700.

At action 710, the logic circuit determines whether the processor circuit is actively processing data in a processing operation or is in an idle state during the processing operation. For instance, an applications processor or a context processor may be aware of the particular memory states of a processing core and/or the instructions to be processed by the processing core and, therefore, is able to determine the state of the processing core. An example of actively processing data in a processing operation is provided in FIG. 2, where a processing core processes data frame-by-frame, and each frame has an active portion and an idle portion.

At action 720, the logic circuit turns on a first switch and a second switch for active processing in response to determining that the processor circuit is actively processing data in the processing operation. An example is shown in FIG. 1, where applications processor 120 determines processing states of the processing cores, and focusing on the GPU core, turns on switches 102 and 103 during an active processing portion of a processing operation. During any of the actions of method 700, switches may be turned on or off by applying a high or low voltage, as appropriate. The first switch and the second switch provide power to a state portion and a logic portion, respectively, of the processing core. At action 720, when both switches are on, the state portion and the logic portion of the processing core are both powered. Looking at FIG. 8, at state 801 the core is actively processing data and both switches (e.g., transistor head switches) are on.

At action 730, the logic circuit turns off the second switch in response to determining that the processor circuit has transitioned to the idle state during the processing operation. Looking at FIG. 1 again, applications processor 120 may determine that the GPU is in an idle portion, by being aware of the instructions being executed by the GPU. The applications processor may then turn off switch 103, thereby power-collapsing logic portion 113 of the GPU core, while maintaining switch 102 on, thereby preserving the state information. An example is also shown in FIG. 8, where the device moves between states 801 and 802. At state 802, the core is in an idle portion of a processing operation.

In some embodiments, action 730 further includes lowering a voltage provided to the core. For instance, applications processor 120 may cause power supply 110 to change a voltage of the voltage rail 111 from an operating voltage to a voltage lower than the operating voltage but high enough that the transistors of the state portion 112 maintain the context data and the data stored in their memory. In one example, an operating voltage may be 1.0 V, whereas a retention voltage may be around 0.7 V. Of course, these numbers are examples, and the scope of embodiments is not limited to any specific operating voltage or retention voltage. During active processing, the applications processor 120 may cause the power supply 110 to return the voltage to the operating voltage. Applications processor 120 may cause power supply 110 to change the voltage based on its determination of operating state. An example architecture for setting state circuitry to a retention voltage is shown in FIG. 6, where applications processor 520 may instruct a voltage regulator 6022 supply a voltage between VDD and VSS to domain 512.

It is apparent from FIG. 8 that the processing core may transition between states 801 and 802 numerous times during the processing operation. Accordingly, the scope of embodiments includes repeating actions 710-730 multiple times during the processing operation, for example, repeating actions 710-730 on a per-frame basis.

At action 740, the logic circuit determines whether the processor circuit is not in the processing operation. In response to determining that the processor circuit is not in the processing operation, the logic circuit turns off both the first switch and the second switch, and as a result, state information is lost. In other words, action 740 includes power-collapsing both the state portion and the logic portion of the processing core. An example is shown in FIG. 8 at state 803, where processing of all frames is completed or an application is closed. An applications processor, such as applications processor 120 FIG. 1, is aware that an application is closed or that frames have been processed because the applications processor is aware of the instructions sent to the processing core. Therefore, the applications processor transitions the core to a power-collapsed state.

The scope of embodiments is not limited to the actions shown in FIG. 7. Other embodiments may add, omit, modify, or rearrange one or more actions. For example, FIG. 1 illustrates an applications processor 120 in communication with three different cores. Various embodiments may include performing the actions of method 700 for multiple cores individually. Accordingly, while the examples above focus on the GPU core, various embodiments may include performing the power-saving operation of method 700 for the MDP core and the video core as well according to their respective frame processing operations.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A circuit comprising:
   a first switch and a second switch configured to receive power from a power supply;
   a processing core including a first plurality of transistors configured to store state information and a second plurality of transistors configured to process data according to the state information, wherein the first plurality of transistors and the second plurality of transistors are physically interspersed within the processing core;
   wherein the first switch is configured to provide power to the first plurality of transistors, and wherein the second switch is configured to provide power to the second plurality of transistors; and
   switching logic configured to:
   turn on the first switch and the second switch for active processing, and
   maintain the first switch on and turn off the second switch during an idle state of the processing core in which the state information is preserved, and wherein the switching logic is further configured to turn off both the first switch and the second switch to power-collapse the processing core, wherein the state information is not preserved.

2. The circuit of claim 1, wherein the processing core includes one or more of a Graphics Processing Unit (GPU), a Mobile Display Processor (MDP), a video core, a video front end core, a Wide Area Network (WAN) core, and a Wireless Local Area Network (WLAN) core.

3. The circuit of claim 1, wherein the first switch comprises a voltage regulator.

4. The circuit of claim 1, further comprising an applications processor, wherein the applications processor includes the switching logic.

5. The circuit of claim 4, wherein the processing core is included in a multi-core processor.

6. The circuit of claim 1, wherein the first and second switches comprise head switches disposed between a power rail and the respective pluralities of transistors.

7. The circuit of claim 6, wherein the head switches comprise PMOS transistors.

8. The circuit of claim 1, wherein the first switch couples the power supply to the first plurality of transistors by a first set of metal lines in a semiconductor device, and wherein the second switch couples the power supply to the second plurality of transistors by a second set of metal lines in the semiconductor device.

9. The circuit of claim 1, further comprising a system on a chip (SoC) having additional processing cores configured to receive power from the power supply.

10. The circuit of claim 1, wherein the switching logic is further configured to lower a voltage from the power supply to a retention voltage of the first plurality of transistors in response to the idle state of the processing core.

11. The circuit of claim 1, including a low drop out (LDO) voltage regulator the configured to provide a retention voltage to the first plurality of transistors.

12. A method for controlling power consumption in a processor circuit, the method comprising:
   determining, using switching logic, whether the processor circuit is actively processing data in a processing operation or is in an idle state during the processing operation, the switching logic being in communication with a first switch and a second switch configured to receive power from a power supply, further wherein the first switch is configured to provide power to a first plurality of transistors storing state information, and the second switch is configured to provide power to a second plurality of transistors configured for processing data according to the state information;
   turning on the first switch and the second switch for active processing in response to determining that the processor circuit is actively processing data in the processing operation, and
   subsequently turning off the second switch in response to determining that the processor circuit has transitioned to the idle state during the processing operation, while preserving the state information;
   wherein determining further comprises:
   determining whether the processor circuit is not in the processing operation; and the method further including:
   turning off both the first switch and the second switch in response to determining that the processor circuit is not in the processing operation so that the state information is lost.

13. The method of claim 9, further comprising:
when the processor circuit is in the idle state during the processing operation, reducing a voltage supplied to the first plurality of transistors to a retention voltage below that of an operating voltage.

14. The method of claim 13, wherein reducing the voltage supplied to the first plurality of transistors includes controlling a voltage regulator in communication with the first plurality of transistors.

15. The method of claim 12, wherein turning off the second switch further comprises maintaining the first switch on.

16. The method of claim 12, wherein turning off the second switch is performed by an applications processor separate from the first plurality of transistors and the second plurality of transistors.

17. A circuit for controlling power consumption, the circuit comprising:
a processing core including:
means for supplying power to the processing core;
a first switch and a second switch configured to receive the power from the means for supplying power, wherein the first switch is configured to provide power to a first plurality of transistors storing state information, and the second switch is configured to provide power to a second plurality of transistors configured for processing data according to the state information;
means for turning on the first switch and the second switch for active processing in response to determining that the processing core is actively processing data in a processing operation, and
means for turning off the second switch in response to determining that the processing core has transitioned to an idle state during the processing operation subsequent to actively processing data, while preserving the state information; and
means for turning off both the first switch and the second switch in response to determining that the processing core is not in the processing operation so that the state information is lost.

18. The circuit of claim 17, wherein the means for supplying power comprises a power rail.

19. The circuit of claim 17, wherein the means for turning on the first switch and the second switch and the means for turning off the second switch comprises an applications processor in communication with the first switch and the second switch.

20. The circuit of claim 17, wherein the first switch comprises a PMOS head switch disposed between the means for supplying power and the first plurality of transistors, and wherein the second switch comprises a different PMOS head switch disposed between the means for supplying power and the second plurality of transistors.

21. The circuit of claim 17, wherein the processing core includes one or more of a Graphics Processing Unit (GPU), a Mobile Display Processor (MDP), a video core, a video front end core, a Wide Area Network (WAN) core, and a Wireless Local Area Network (WLAN) core.

22. The circuit of claim 17, wherein the processing core is included in a multi-core processor.

23. The circuit of claim 17, further comprising a system on a chip (SoC) having additional processing cores configured to receive power from the power supply.

24. A system on chip (SoC) comprising:
a processing core having a first set of transistors configured to store state information and a second set of transistors configured to process data according to the state information, wherein the first set of transistors are physically interspersed with the second set of transistors;
a power rail configured to provide power to the processing core;
a first switch disposed between the power rail and a plurality of power connections to the first set of transistors;
a second switch disposed between the power rail and a plurality of power connections to the second set of transistors; and
an applications processor in communication with the first and second switches and configured to:
cause both the first switch and the second switch to be on during an active data processing operation of the processing core; and
cause the first switch to be on and the second switch to be off during an idle state of the processing operation;
wherein the applications processor is further configured to turn off both the first switch and a second switch to power-collapse the processing core, wherein the state information is not preserved.

25. The SoC of claim 24, wherein the switching logic is further configured to lower a voltage from the power supply to a retention voltage of the first plurality of transistors in response to the idle state of the processing core.

26. The SoC of claim 24, wherein the processing core includes one or more of a Graphics Processing Unit (GPU), a Mobile Display Processor (MDP), a video core, a video front end core, a Wide Area Network (WAN) core, and a Wireless Local Area Network (WLAN) core.

27. The SoC of claim 24, wherein the first switch comprises a voltage regulator configured to turn power off or lower a voltage to the first set of transistors.

* * * * *